(12) United States Patent
Takahashi et al.

(10) Patent No.: US 6,290,873 B1
(45) Date of Patent: Sep. 18, 2001

(54) PHOSPHOR PREPARATION METHOD

(75) Inventors: Kenji Takahashi; Chiyuki Umemoto; Makoto Funabashi; Yuji Isoda, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/471,113

(22) Filed: Dec. 23, 1999

(30) Foreign Application Priority Data

Dec. 25, 1998 (JP) .................................................. 10-370465

(51) Int. Cl.$^7$ .................................................. C09K 11/61
(52) U.S. Cl. .................................................. 252/301.4 H
(58) Field of Search ...................... 252/301.4 H

(56) References Cited

U.S. PATENT DOCUMENTS 5,549,843 * 8/1996 Smith et al. .................. 252/301.4 H

FOREIGN PATENT DOCUMENTS 0 712 917 A2   5/1996  (EP).
11-106748  *   4/1999  (JP).

OTHER PUBLICATIONS

Database WPI, Section Ch, Week 199407, Derwent Publications Ltd., London, GB; Class E33, AN 1994–054105 XP002133256 & JP 06 009956 A (Fuji Photo Film Co Ltd), Jan. 18, 1994 (1994–01–18) *abstract*.

* cited by examiner

*Primary Examiner*—C. Melissa Koslow
(74) *Attorney, Agent, or Firm*—Sughrue, Mion, Zinn, Macpeak & Seas, PLLC

(57) ABSTRACT

There is provided a method for preparing a highly accelerated-phosphorescent phosphor whose erasability and after-image characteristic are both improved. Phosphor materials are mixed together to obtain a mixture, and the mixture of phosphor materials is fired in a furnace having a firing region whose capacity is 2 to 500 L per kilogram of the mixture, at a temperature of 550 to 1000° C. while introducing 1 to 200 ml of oxygen in volume at room temperature per liter capacity of the firing region in the furnace, to thereby prepare a phosphor represented by the following compositional formula (I):

$$(Ba_{1-a}, M''_a)FX \cdot bM' \cdot cM''' \cdot dA : xLn \qquad (I)$$

wherein, $M''_a$ is alkaline earth metal such as Sr, Ca or Mg; $M'$ is alkali metal such as Li, Na or K; $M'''$ is Al, Ga or In; X is Cl, Br or I; Ln is rare earth element such as Ce, Eu or the like; A is a metallic oxide such as $Al_2O_3$; and a, b, c, d and x are numerical values within the ranges of $0 \leq a \leq 0.3$, $0 < b \leq 2$, $0 \leq c \leq 2$, $5 \times 10^{-5} \leq d \leq 0.5$, and $0 < x \leq 0.2$.

16 Claims, 2 Drawing Sheets

F I G. 1
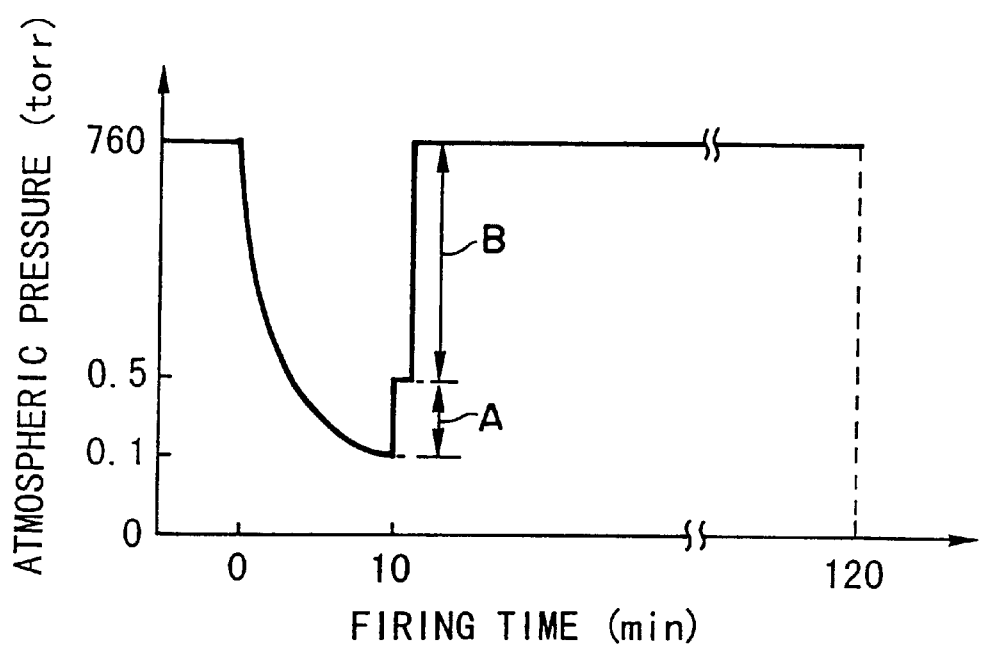

PHOSPHOR PREPARATION METHOD

BACKGROUND OF THE INVENTION

1. Field of the Invention

The present invention relates to a phosphor preparation method. Specifically, the present invention relates to a preparation method of a rare earth-activated, alkaline earth metal fluorohalide based accelerated-phosphorescent phosphor for use in radiation image recording and reproducing methods.

2. Description of the Related Art

Conventionally, there has been known a bivalent europium-activated barium fluorohalide phosphor (BaFX: $Eu^{2+}$; wherein X is halogen other than fluorine) which emits light (instantaneous emission of light) in ranges from a near-ultraviolet region to a blue beam region by excitation with radiation such as X-ray, electron beam, or ultraviolet beam. The phosphor is used as that for a radiosensitization screen employed in radiography or the like.

Further, there has recently been found that, when the above-described phosphor is exposed to radiation such as X-ray, electron beam, or ultraviolet beam, and thereafter, excited with electromagnetic wave (excitation light) in ranges from a visible region to a red beam region, the phosphor emits light (accelerated-phosphorescent emission) in ranges from a near-ultraviolet region to a blue beam region (which will be hereinafter referred to as accelerated-phosphorescent characteristics). Thus, the above-described phosphor has been noted especially as a phosphor useful for radiation image conversion panels. Such panels are typically radiation image recording and reproducing methods, which employ accelerated-phosphorescent phosphor.

In particular, a phosphor containing iodine as a part of halogen X has a high accelerated-phosphorescent luminance. As the amount of iodine therein increases, a peak of an accelerated-phosphorescent excitation spectrum shifts to a range of longer wavelength. Accordingly, there has been proposed a method in which the phosphor is used in combination with a laser which emits light whose wavelength is in a red beam region (for example, He—Ne laser), or a semiconductor laser which emits light whose wavelength is in a red beam region or an infrared region in accordance with a content amount of iodine.

The above-described radiation image recording and reproducing method is constructed in such a manner that an accelerated-phosphorescent phosphor of a radiation image conversion panel is allowed to absorb radiation energy transmitted through a subject or emitted from an object to be examined. Thereafter, the accelerated-phosphorescent phosphor is excited by an electromagnetic wave in accordance with a time series to thereby allow the radiation energy stored in the accelerated-phosphorescent phosphor to emerge as fluorescence and an electric signal is obtained by photoelectrically reading the fluorescence. Finally, a visual image is produced based on the obtained electric signal, such as on a recording material such as a photosensitive film, and/or on a display device such as a CRT.

In carrying out radiation image conversion methods, the radiation image conversion panel itself generally deteriorates very little even with radiation or electromagnetic wave being irradiated thereto. Therefore, the radiation image conversion panel can be used repeatedly over a long period of time. Usually, the radiation energy stored in the panel is read by scanning a laser beam across the panel. However, the radiation energy cannot be completely emitted or erased from the panel, only by using a scanning laser beam. Accordingly, in order that radiation energy remaining in the panel be emitted, there has been proposed, as is disclosed in Japanese Patent Application Laid-Open (JP-A) No. 56-11392 and the like, a method in which remaining radiation energy be erased by causing light of accelerated-phosphorescent luminescence in an excitation wavelength region to be irradiated onto the panel after the reading.

However, there has been found that when the radiation energy stored in a panel using an accelerated-phosphorescent phosphor which contains iodine is erased in a short time (for example, several seconds to several minutes in a daylight fluorescent lamp), which is applied to a case in which an ordinary accelerated-phosphorescent phosphor is used, remaining energy cannot be sufficiently erased, and further, a portion of the remaining energy is recovered (an after image emerges) with the passage of time after the erasing. When the panel is used repeatedly, the above-described erasability and after-image characteristic adversely affects the quality of an image. Further, when the time for erasing is increased, the total time required for reading and erasing increases to an extent, to cause deterioration in processing ability of the device and generation of heat in an eraser.

The above-described phosphor is generally prepared by the following method. First, a mixture of phosphor materials is prepared by a dry process in which the phosphor materials are homogeneously mixed in a dry state, or a wet process in which the phosphor materials are homogeneously mixed together in a slurry state and then dried. Next, the mixture of the phosphor materials is fired ordinarily at a temperature near a melting point of a host crystal (Ba, FX, and the like) in a near reducing atmosphere or in a neutral atmosphere in several hours. The obtained fired product may be further fired if desired. The firing allows growth of the host crystal of the phosphor, and at the same time, diffuses activator elements in the host crystal. Further, an $F^+$-center which serves as a central source of an accelerated phosphorescence is also generated. Accordingly, the firing is an important process which exerts an influence upon light emission characteristics of the phosphor. After the firing, the obtained phosphor is subjected to washing, classification, and the like, if necessary.

Further, JP-A Nos. 7-233369 and 10-195431 each disclose a method for preparing a rare earth-activated, alkaline earth metal fluorohalide based accelerated-phosphorescent phosphor (which may be hereinafter referred to simply as "phosphor") having a tetradecahedral structure in which grain shape and grain aspect ratio are controlled. In a radiation image conversion panel having an accelerated-phosphorescent phosphor layer in which a rare earth-activated, alkaline earth metal fluorohalide based accelerated-phosphorescent phosphor having a tetradecahedral structure (which may be hereinafter referred to simply as "tetradecahedron-structured phosphor") is provided, the tetradecahedron-structured phosphor is configured with a low directionality in the accelerated-phosphorescent phosphor layer, and therefore, the undesirable transverse extension of the excitation light and the accelerated-phosphorescent emission is lessened and the sharpness of a resultant radiographic reproduction image improves. The emission characteristics, particularly, sharpness, of the phosphor obtained by the preparation methods disclosed in the above-described publications are extremely high. However, there has been demand for further improvement in sensitivity and erasability of the phosphors when the phosphors are used in radiation image recording and reproducing methods.

A method for improvement in erasability of an accelerated-phosphorescent phosphor is disclosed in, for example, JP-A No. 8-231952. This method comprises the steps of: firing a mixture of materials to obtain an intermediate product. The intermediate product is thereafter annealed at a temperature lower than the firing temperature in a flow of a slightly oxidized atmospheric gas. However, this method has problems in that operations such as decision of an intermediate product, control of respective temperatures during the firing and annealing, determination of an annealing time, and determination of conditions that oxidized gas flows, are complicated. Further, it is not clear what conditions contribute to erasability.

As described above, under the existing circumstances, factors for determining the above-described erasability and after-image characteristic of accelerated-phosphorescent phosphor have not been made clear. For this reason, the best conditions for preparation which are provided to improve the erasability and after-image characteristic cannot be set, and a problem arises in stability of the preparation.

SUMMARY OF THE INVENTION

The present invention has been devised to address the above-described problems. Objects of the present invention are to provide a method for preparing a rare earth-activated, alkaline earth metal fluorohalide based phosphor whose erasability and/or after-image characteristics are improved, which phosphor has a high accelerated-phosphorescent luminescence and can be used in combination with a laser which emits light whose wavelength is located in a red beam region or an infrared region.

The present inventors have studied diligently, and as a result, have found that at least some, if not all, of the above-described objects can be achieved by controlling firing conditions of a mixture of phosphor materials, particularly, introducing a predetermined amount of oxygen in a weakly reducing atmosphere or a neutral atmosphere in a firing process.

The process results in a compound having the formula:

$$(Ba_{1-a}, M^{II}_a)FX \cdot bM^{I}X' \cdot cM^{III}X''_3 \cdot dA: xLn \quad (I)$$

wherein $M^{II}$ is at least one alkaline earth metal selected from the group consisting of Sr, Ca and Mg; $M^{I}$ is at least one alkali metal selected from the group consisting of Li, Na, K, Rb and Cs; $M^{III}$ is at least one trivalent metal element selected from the group consisting of Al, Ga, In, Tl, Sc, Y, La, Gd and Lu; X is at least one halogen selected from the group consisting of Cl, Br and I; each of X' and X" is at least one halogen selected from the group consisting of F, CL, Br and I; Ln is at least one rare earth element selected from the group consisting of Ce, Pr, Sm, Eu, Gd, Th, Dy, Ho, Nd, Er, Tm and Yb; A is at least one metallic oxide selected from the group consisting of $Al_2O_3$, $SiO_2$ and $ZrO_2$ and a, b, c, d and x are numerical values within the ranges $0 \leq a \leq 0.3$, $0 \leq b \leq 2$, $0 \leq c \leq 2$, $5 \times 10^{-5} \leq d \leq 0.5$, and $0 \leq x \leq 0.2$.

The compound is formed by preparing a mixture of a barium halide selected from the group consisting of $BaF_2$, $BaCl_2$, $BaBr_2$, $BaI_2$, BAFCl, BaFBr and BaFI; an alkaline earth metal halide selected from the group consisting of $CaF_2$, $CaCl_2$, $CaBr_2$, $CaI_2$, $SrF_2$, $SrCl_2$, $SrBr_2$, $SrI_2$, $MgF_2$, $MgCl_2$, $MgBr_2$ and $MgI_2$; an alkali metal halide selected from the group consisting of CsCl, CsBr, CsI, NaCl NaBr, NaI, KCl, KBr, KI, RbCl, RbBr, RbI, RbF, CsF, NaF, KF, LiF, LiCl, LiBr and LiI; a metal oxide selected from the group consisting of $Al_2O_3$, $SiO_2$ and $ZrO_2$ and a rare earth element compound selected from the group consisting of a halide, oxide, nitrate and sulfate.

Next, the mixture is placed in a furnace having a firing region with a capacity of 2 to 500 liters per kilogram of the mixture. Thereafter, the mixture is fired in the furnace at a temperature of 550 to 1000° C., while introducing oxygen into the firing region of the furnace.

The amount of oxygen introduced is preferably from 0.1 to 200 ml by volume at room temperature, per liter capacity of the firing region of the furnace. As the capacity of the firing region is from 2 to 500 liters per kilogram of the mixture, the amount of oxygen introduced is 0.2 to 100,000 ml by volume at room temperature per kilogram of the mixture.

The amount of oxygen is more preferably 1 to 100 ml by volume at room temperature per liter capacity of the firing region, or 2 ml to 50,000 ml of oxygen by volume at room temperature per kilogram of the mixture. The firing time is preferably 0.5 to 6 hours.

The introduction of oxygen is preferably carried out using air or oxygen diluted by nitrogen or inert gas.

The introduction of oxygen is preferably carried out after evacuation of the firing region of the furnace. Specifically, immediately after the firing starts, the firing region of the furnace is evacuated to a pressure of 0.1 torr or less. Then oxygen is introduced and successively nitrogen or inert gas, which substantially does not contain oxygen, is introduced. Further, in the process in which nitrogen or inert gas, which substantially does not contain oxygen, is introduced, preferably, the introduction of such gas is carried out until the interior of the furnace is brought to nearly atmospheric pressure.

In the firing process, the introduction of oxygen is preferably carried out in an atmosphere in which a partial pressure of oxygen in the furnace increases continuously or intermittently.

In the present invention, when the accelerated-phosphorescent phosphor is prepared, a predetermined amount of oxygen is preferably introduced in the firing process and the firing is carried out in the presence of the predetermined amount of oxygen. This improves the erasability and after-image characteristics of the resulting phosphor product.

Thus, the phosphor prepared according to a preferred embodiment of the present invention is useful for radiation image recording and reproducing methods in a radiation image conversion panel. Hence, an image having an improved quality can be obtained. Further, panel processing time does not increase, thereby resulting in improvement of processing ability and stability of a reading device.

BRIEF DESCRIPTION OF THE DRAWINGS

FIG. 1 is a graph which shows an example in which introduction of predefined quantities of oxygen is controlled in accordance with the present invention.

DESCRIPTION OF THE PREFERRED EMBODIMENTS

Figure 2:
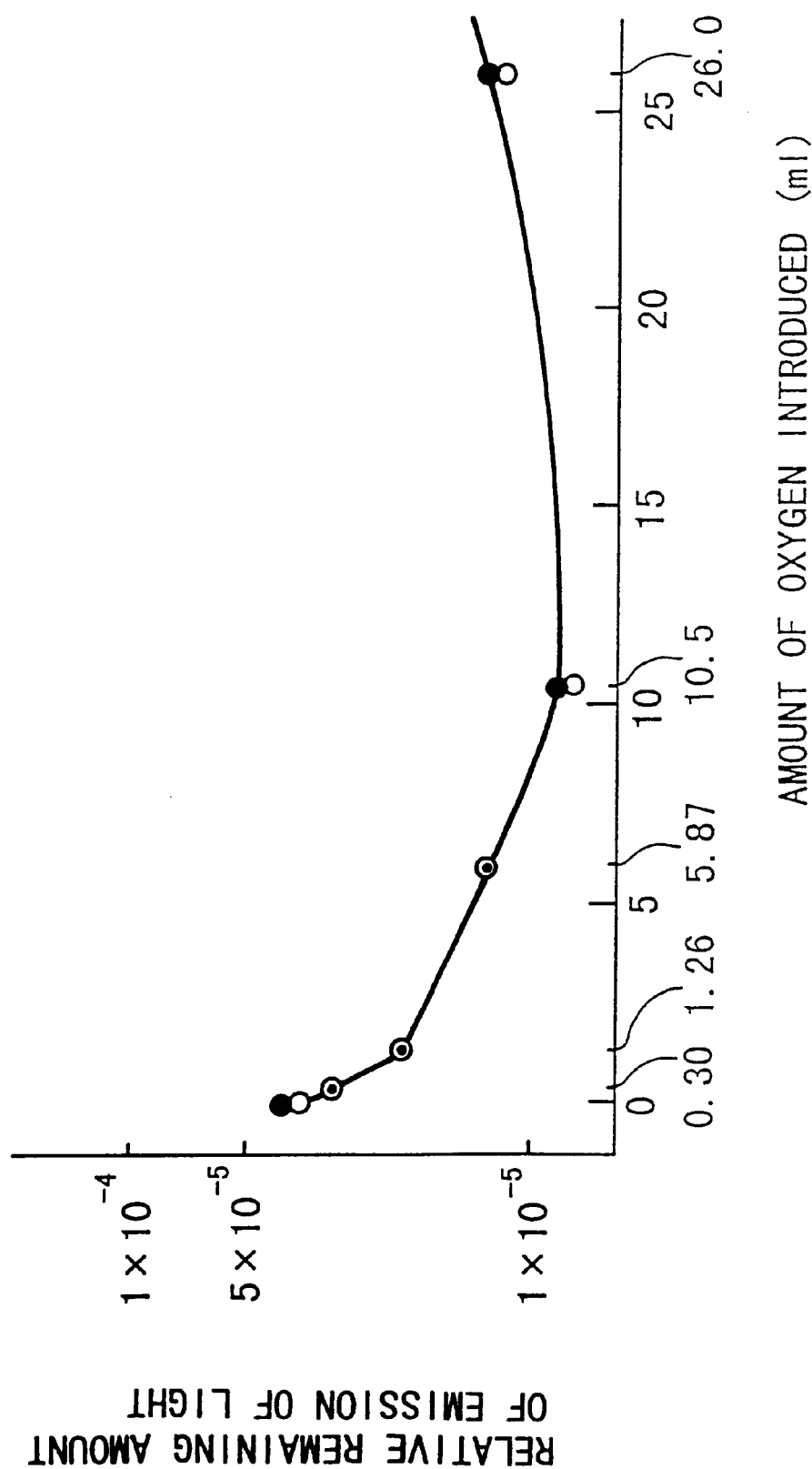
FIG. 2 is a graph which shows the relation between the amount of oxygen introduced and a remaining amount of emission of light in a bivalent europium-activated, barium fluorobromide based accelerated-phosphorescent and iodine-containing phosphor according to the present invention.

A phosphor preparation method according to the present invention will be hereinafter explained in detail in accordance with preparing processes described later.

A phosphor preparation method according to the present invention will be hereinafter explained in detail in accordance with preparing processes described later.

Examples of phosphor materials which can be used in the preparation method of the present invention include the following compounds (1) to (5):

(1) at least one barium halide selected from the group consisting of $BaF_2$, $BaCl_2$, $BaBr_2$, $BaI_2$, BaFCl, BaFBr and BaFI;

(2) at least one alkaline earth metal halide selected from the group consisting of $CaF_2$, $CaCl_2$, $CaBr_2$, $CaI_2$, $SrF_2$, $SrCl_2$, $SrBr_2$, $SrI_2$, $MgF_2$, $MgCl_2$, $MgBr_2$ and $MgI_2$;

(3) at least one alkali metal halide selected from the group consisting of CsCl, CsBr, CsI, NaCl, NaBr, NaI, KCl, KBr, KI, RbCl, RbBr, RbI, RbF, CsF, NaF, KF, LiF, LiCl, LiBr and LiI;

(4) at least one metal oxide selected from the group consisting of $Al_2O_3$, $SiO_2$ and $ZrO_2$ and (5) at least one compound selected from the group consisting of rare earth element compounds such as halide, oxide, nitrate and sulfate.

If desired, ammonium halide ($NH_4X'$; wherein X' is F, Cl, Br or I) or the like may be used as a flux.

In the preparation of the phosphor, first, a mixture of phosphor materials is prepared by stoichometrically measuring by weight and mixing the above-described (1) barium halide, (2) alkaline earth metal halide, (3) alkali metal halide, (4) metal oxide, and (5) rare earth element compound at a relative compounding ratio corresponding to the compositional formula (I), as described previously in the Summary of the Invention and later herein.

The preparation of the mixture of phosphor materials may be carried out by any one of the following processes: (i) the phosphor materials (1) to (5) are mixed simply; (ii) the phosphor materials (1) to (4) are mixed and heated at a temperature of 100° C. or more for several hours, and thereafter, the phosphor material (5) is mixed with a resultant heat-treated product, or the phosphor materials (1) to (5) are mixed together and a resultant mixture is heated at a temperature of 100° C. or more for several hours; or (iii) the phosphor materials (1) to (4) are mixed in a state of suspension, with the obtained suspension being dried under reduced pressure, vacuum drying, or spray drying while being heated (preferably to 50 to 200° C.), and thereafter, the phosphor material (5) is mixed with the obtained dry product.

As a modification of the above-described process (ii), a process in which the phosphor materials (1) to (5) are mixed and the above-described heat treatment is performed for the mixture. Further, as a modification of the above-described process (iii), a process in which the phosphor materials (1) to (5) are mixed in a state of suspension and the suspension is dried. Alternatively, the phosphor materials (2) to (4) may be added to and mixed with a heat-treated or dried mixture. When the firing is carried out two times or more, the phosphor materials (3) and (4) may be added after primary firing.

Additionally, the method for preparing a rare earth-activated, alkaline earth metal fluorohalide based accelerated-phosphorescent phosphor having a tetradecahedral structure in which grain shape and grain aspect ratio are controlled, which has previously been mentioned in JP-A Nos. 7-233369 and 10-195431, namely, a combination of the above-described conventional preparing method and a preparing method in which various conditions including shearing force applied at the time of mixing phosphor materials, addition of various phosphor materials, a timing of mixing, and the like are controlled can also be applied to the preparing method of the present invention.

In any of the above-described methods, well known mixing devices, for example, various mixers, a V-type blender, a ball mill, and a rod mill can be appropriately selected and used.

Next, the mixture of phosphor materials prepared as described above is packed into a heat resistant container such as a quartz boat, an alumina crucible, a quartz crucible, or a silicon-carbide container, and placed and fired in a reactor core of a furnace. A firing furnace which can be used in this case needs to have a firing region whose capacity is 2 to 500 L, preferably 5 to 50 L, for 1 kg of the mixture of phosphor materials. When the capacity of the firing region is less than 2 L for 1 kg of the mixture of the phosphor materials, the phosphor is tightly packed in a small space, and therefore, uniform firing becomes difficult. When the capacity of the firing region exceeds 500 L, a volatilized halogen atmosphere is too weak and the characteristics of the phosphor may be deteriorated. Either case is not preferable.

The firing temperature is preferably in the range of 550 to 1000° C., more preferably in the range of 600 to 850° C.

The firing time is properly 0.5 to 6 hours, preferably 1 to 3 hours although it varies depending on the amount of the mixture of phosphor materials packed, firing temperature, and temperature at which the mixture is taken out from a furnace, and the like. Examples of the atmosphere employed for the firing include a neutral atmosphere such as a nitrogen gas atmosphere, an argon gas atmosphere, or the like, a weakly reducing atmosphere such as a nitrogen gas atmosphere containing a small amount of hydrogen gas, a carbon dioxide atmosphere containing carbon monoxide, and the like. When a trivalent europium compound is contained as a rare earth element of the above-described phosphor material (5), the trivalent europium compound is reduced to a bivalent europium compound in the firing process.

The preparation method of the present invention is mainly characterized in that firing is carried out while 0.1 to 200 ml of oxygen in volume at room temperature is being introduced for 1 L of the capacity of the firing region in the furnace. Namely, oxygen required for improvement in erasability and residual characteristic in the firing the mixture of materials can be introduced by regulating the capacity of the firing region for 1 kg of the mixture of materials to be fired and the amount of oxygen introduced for 1 L of the capacity of the firing region. The amount of oxygen introduced is preferably 1 to 100 ml. When the amount of oxygen introduced for 1 L of the capacity of the firing region of the furnace is less than 0.1 ml, effects of improvement in erasability and residual characteristic are not sufficient. Further, when the amount of oxygen introduced exceeds 200 ml, an accelerated-phosphorescent luminance remarkably deteriorates. Either case is not preferable.

A method of introducing oxygen in the firing process is not limited and any method in which a required amount of oxygen can be supplied properly and under conditions by which influences of other gases can be made minimum by introducing a predetermined amount of oxygen after the interior of a furnace is once brought into near vacuum due to exhaust of air therefrom is preferably used. Further, by replacing gas within the furnace with a gas containing a predetermined amount of oxygen, the amount of oxygen within the furnace can be introduced so as to increase in a stepwise manner or continuously.

The introduction of oxygen is carried out by, for example, the following procedure.

First, immediately after the mixture of phosphor materials has been placed in an electric furnace whose temperature has reached the firing temperature, evacuation is carried out for several minutes to exhaust air from the reactor core. At this time, the degree of vacuum is desirably 0.1 torr or less. Subsequently, a predetermined amount of oxygen is supplied and charged to a desired atmospheric pressure. At this time, the amount of oxygen introduced is, as described above, 0.1 to 200 ml for 1 L of the capacity of the firing region in the furnace, and the volume of the introduced oxygen is measured in volume at room temperature. After the predetermined amount of oxygen has been properly introduced into the furnace, inert gas or weakly reducing gas, which is the above-described furnace interior atmosphere, is further introduced into the furnace and the pressure within the furnace may be adjusted to be about 760 torr (1 atm.), that is, a pressure value in the vicinity of atmospheric pressure.

For example, oxygen-containing gas such as air, or oxygen diluted by inert gas may be introduced in place of oxygen. The amount of oxygen to be introduced can be adjusted to an optimum value in the above-described range in accordance with an amount of the mixture of phosphor materials, the firing time, and the like. The amount of air which is introduced in place of oxygen is generally in the range of 0.5 to 1000 ml for 1 L of the capacity of the firing region in the furnace, preferably in the range of 5 to 500 ml.

The introduction of oxygen may be carried out before or after evacuation. For example, an extremely small amount of oxygen may merely be introduced into the reactor core under a weakly reducing atmosphere at atmospheric pressure or a neutral atmosphere. Alternatively, the introduction of oxygen may be carried out so that the amount of oxygen within the furnace is increased due to gas which contains oxygen being introduced into the furnace.

When the firing is performed two times or more, for example, when the mixture of phosphor materials is once fired, and thereafter, the fired product is taken out from an electric furnace and allowed to stand for cooling, and further pulverized into fine powder by an ordinary pulverizer such as a mortar, a ball mill, a tube mill, or a centrifugal mill, if necessary, and the pulverized product is fired again (secondary firing) in the electric furnace, the latter firing is carried out under the above-described firing conditions.

A powdered accelerated-phosphorescent phosphor is obtained by the above-described firing process. The obtained phosphor may be further subjected to various general processings in the preparation of the phosphor, for example, washing, drying, and sieving if desired.

The above-described preparing method is used to obtain a rare earth-activated, alkaline earth metal fluorohalide based phosphor represented by the following basic compositional formula (I):

$$(Ba_{1-a}, M''_a)FX.bM'X'.cM'''X''_3.dA:xLn \qquad (I)$$

wherein $M''$ is at least one alkaline earth metal selected from the group consisting of Sr, Ca and Mg; $M'$ is at least one alkali metal selected from the group consisting of Li, Na, K, Rb and Cs; $M'''$ is at least one trivalent metal element selected from the group consisting of Al, Ga, In, Tl, Sc, Y, La, Gd and Lu; X is at least one halogen selected from the group consisting of Cl, Br and I; each of X' and X'' is at least one halogen selected from the group consisting of F, Cl, Br and I; Ln is at least one rare earth element selected from the group consisting of Ce, Pr, Sm, Eu, Gd, Tb, Dy, Ho, Nd, Er, Tm and Yb.

A is at least one metallic oxide selected from the group consisting of $Al_2O_3$, $SiO_2$ and $ZrO_2$; and a, b, c, d and x are numerical values within the ranges of $0 \leq a \leq 0.3$, $0 < b \leq 2$, $0 \leq c \leq 2$, $0 \leq d \leq 2$, $5 \times 10^{-5} \leq d \leq 0.5$, and $0 < x \leq 0.2$.

The bivalent europium-activated barium fluorohalide-based phosphor according to the present invention has the above-described compositional formula (I) as a basic composition. In the preparation of the phosphor, various additive components can further be added for the purpose of improvement in light emission characteristics of the phosphor, such as accelerated-phosphorescent luminance, accelerated-phosphorescent decay characteristic, and the like. Examples of such additive components include the following materials: B (boron) disclosed in JP-A No. 57-23673; As (arsenic) disclosed in JP-A No. 57-23675; a tetrafluoroborate compound disclosed in JP-A No. 59-27980; a hexafluoro compound disclosed in JP-A No. 59-47289; transition metals such as V, Cr, Mn, Fe, Co and Ni disclosed in JP-A No. 59-56480; and $BeX''_2$ (wherein X'' is at least one halogen selected from the group consisting of F, Cl, Br and I) disclosed in JP-A No. 59-75200.

In a case in which the phosphor prepared by the preparing method of the present invention contains these additive components, the additive components are added to and mixed with the phosphor when the phosphor materials are measured by weight and mixed, or before the firing process.

EXAMPLES

Next, examples of the present invention and comparative examples will be described, but the present invention is not limited by these examples.

Example 1

175.34 g of barium fluoride ($BaF_2$), 252.58 g of barium bromide ($BaBr_2$), 58.67 g of barium iodide ($BaI_2$), and 0.783 g of europium bromide ($EuBr_3$) were added to 500 cc of distilled water ($H_2O$) and the resulting solution was mixed and stirred to obtain a suspension. The resulting suspension was dried under a reduced pressure at 60° C. for 3 hours, and thereafter, further dried at 150° C. for 3 hours under a vacuum.

Mixed with 100 g of the resulting dry product were 0.016 g of calcium fluoride ($CaF_2$), 0.041 g of calcium bromide ($CaBr_2$), 0.063 g of sodium bromide (NaBr), and 0.131 g of cesium bromide (CsBr) to thereby prepare a mixture of phosphor materials.

100 g of the mixture of phosphor materials was loaded on a quartz boat, and thereafter, placed in a reactor core which can be evacuated (the capacity of a firing region is 1.3 L), and was fired within an electric furnace in a nitrogen gas atmosphere at 900° C. for 2 hours. During the firing, an extremely small amount of oxygen was introduced in such a manner as described below.

FIG. 1 shows a condition for introduction of oxygen in the form of a graph in which the firing time is indicated by a horizontal axis and the atmospheric pressure in a reactor core is indicated by a vertical axis. In this figure, ranges indicated by "A" and "B" each show introduction of oxygen and charging of nitrogen gas, respectively.

First, the reactor core having the mixture of phosphor materials contained therein was placed in an electric furnace, and immediately thereafter, exhaust of air was started and the degree of vacuum in the reactor core reached about 0.1 torr in 10 minutes. Subsequently, 1.5 ml of air (0.3 ml in terms of oxygen) was introduced (A). Thereafter, nitrogen gas was continuously charged until the interior of the furnace was brought to substantially atmospheric pressure (760 torr) (B).

After completion of the firing, the fired product was taken out from the furnace and cooled down. Then, the fired product was pulverized to thereby obtain a powdered accelerated-phosphorescent phosphor, that is, a bivalent europium-activated, barium fluorobromide based iodine-containing phosphor represented by the following compositional formula.

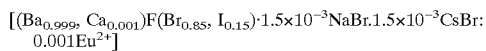

Examples 2 to 5

Various powdered bivalent europium-activated, barium fluorobromide based iodine-containing phosphors of Examples 2 to 5 were obtained in the same way as in Example 1, except that respective amounts of oxygen introduced after the evacuation were 1.26 ml, 5.87 ml, 10.5 ml, and 26.0 ml.

Comparative Example 1

A powdered bivalent europium-activated, barium fluorobromide based iodine-containing phosphor of comparative example 1 was obtained in the same way as in Example 1, except that no oxygen is introduced after the evacuation.

Next, the phosphors obtained in the above-described examples and comparative example were evaluated by an erasability characteristic test and an after-image characteristic test.

(1) Erasability Characteristic Test

The phosphors were each irradiated with an X-ray having tube voltage of 80 KVp, followed by the excitation with He—Ne laser light (whose wavelength is 632.8 nm). The amount of emission of accelerated phosphorescence (an initial light emission amount) from the phosphor was measured. Next, the phosphor was irradiated with light emitted from a daylight fluorescent lamp for 1 minute to allow erasure of light, and thereafter, the phosphor was excited again with the He—Ne laser beam and the amount of emission of accelerated phosphorescence (a remaining light emission amount) was measured. The erasability of the phosphor was evaluated by a relative remaining light emission amount, which is ratio of the remaining light emission amount to the initial light emission amount.

(2) After-image Characteristic Test

The initial light emission amount of the phosphor was measured in the same way as the above-described test, and thereafter, the phosphor was irradiated with light emitted from a daylight fluorescent lamp for 1 minute to erase light and was allowed to stand at 35° C. for 3 hours. Subsequently, the phosphor was excited again with He—Ne laser light and the amount of emission of accelerated phosphorescence (the remaining light emission amount) was measured. The after-image characteristic was evaluated by a relative remaining light emission amount, which is a ratio of the remaining light emission amount to the initial light emission amount.

The obtained results are shown in a graph of FIG. 2.

FIG. 2 shows a graph in which the amount of oxygen introduced (unit: ml) is indicated by a horizontal axis and the relative remaining light emission amount is indicated by a vertical axis for the phosphors obtained in Examples 1 to 5 and Comparative example 1, which each have the following compositional formula:

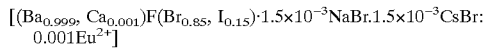

In this figure, a white point shows the result of the after-image characteristic and a black point shows the result of the erasability.

As can be seen from FIG. 2, the bivalent europium-activated, barium fluorobromide based iodine-containing phosphors (Examples 1 to 5) prepared in accordance with the present invention indicates that the remaining light emission amount after the erasure of light and the remaining light emission amount with the passage of time were both decreased as compared with the phosphor (Comparative example 1) prepared by a conventional preparing method.

Particularly, when the amount of oxygen introduced is in the range of 0.30 to 26.0 ml, the erasability and the after-image characteristic have been significantly improved.

Example 6

0.0254 mol (9.647 g) of cerium bromide ($CeBr_3$) was dissolved in 600 ml of methanol and the resulting solution was added to 8.47 mol (2000 g) of barium fluorobromide (BaFBr). The mixture thus obtained was stirred for 5 minutes, and then heated and dried at 150° C. in vacuo. An obtained dried product was pulverized by a mortar. Mixed with 94.48 g of the dried product ($BaFBr/CeBr_3$=0.40 mol/ 0.0012 mol) were 0.00159 mol (0.278 g) of barium fluoride ($BaF_2$), 0.00120 mol (0.255 g) of cesium bromide (CsBr), and 0.00120 mol (0.094 g) of calcium fluoride ($CaF_2$) while being stirred for 15 minutes in a dry process to thereby obtain a mixture of phosphor materials.

20 g of the mixture was placed in a reactor core tube and subjected to reduced pressure. The obtained product was allowed to stand in a tube-type electric furnace having a quartz reactor core whose interior temperature is 97° C. for 3 minutes. Thereafter, the interior of the furnace was evacuated and $N_2$ gas was introduced into the furnace until the interior of the furnace was brought substantially to an atmospheric pressure, and was fired at 97° C. for 119 minutes in this atmosphere. Subsequently, evacuation of the furnace was started, and 1 minute later, the reactor core tube was taken out from the electric furnace while being evacuated, and then, allowed to cool for 30 minutes. Thereafter, the fired product was taken out from the reactor core tube and pulverized by a mortar and a pin mill to thereby obtain a powdered phosphor.

A mixture of 0.06 g (0.3% by weight) of powdered silica (aerosil) with 20 g of the powdered phosphor was placed in the reactor core tube and subjected to reduced pressure, and was placed in a tube-type electric furnace having a quartz reactor tube whose interior temperature was 890° C. for 3 minutes. The capacity of the firing region in the electric furnace was 9 L. Thereafter, the interior of the furnace was evacuated and $N_2$ gas was introduced into the furnace until the interior of the furnace was brought substantially to an atmospheric pressure of 760 torr. Subsequently, oxygen was introduced into the electric furnace under a condition of 5 ml/minute, and was fired at 890° C. for 119 minutes while the same amount of gas was discharged therefrom (the total amount of oxygen introduced was 595 ml). After the firing, the evacuation was started, and 1 minute later, the reactor core tube was taken out from the electric furnace while being evacuated, and then, allowed to cool for 30 minutes. Subsequently, the fired product was taken out from the reactor core tube and pulverized by a mortar. Thus, a cerium-activated, barium fluorobromide based phosphor having the compositional formula: BaFBr: $0.003Ce^{3+}$, with 0.3 mol % of $CaF_2$ and 0.3 mol % of CsBr added thereto, was obtained.

Example 7

A cerium-activated, barium fluorobromide based phosphor of Example 7 having the compositional formula:

BaFBr: $0.003Ce^{3+}$, with 0.3 mol % of $CaF_2$ and 0.3 mol % of CsBr added thereto, was obtained in the same way as in Example 6 except that the amount of oxygen introduced into the electric furnace was 10 ml per minute (the total amount of oxygen introduced was 1190 ml).

Example 8

A cerium-activated, barium fluorobromide based phosphor of Example 8 having the compositional formula: BaFBr: $0.003Ce^{3+}$, with 0.3 mol % of $CaF_2$ and 0.3 mol % of CsBr added thereto, was obtained in the same way as in Example 6 except that oxygen was introduced into the electric furnace 60 minutes afterwards (the total amount of oxygen introduced was 295 ml).

Example 9

A cerium-activated, barium fluorobromide based phosphor of Example 9 having the compositional formula: BaFBr: $0.003Ce^{3+}$, with 0.3 mol % of $CaF_2$ and 0.3 mol % of CsBr added thereto, was obtained in the same way as in Example 6 except that oxygen was introduced into the electric furnace 60 minutes afterwards (the total amount of oxygen introduced is 590 ml).

Comparative Example 2

A cerium-activated, barium fluorobromide based phosphor of Comparative Example 2 having the compositional formula: BaFBr: $0.003Ce^{3+}$, with 0.3 mol % of $CaF_2$ and 0.3 mol % of CsBr added thereto, was obtained in the same way as in Example 6 except that the firing was performed with no oxygen being introduced into the electric furnace.

(4) Evaluation of Erasability (erasure value)

The phosphors obtained in Examples 6 to 9 and Comparative example 2 were each irradiated with an X-ray of 80 KVp at 1 R, followed by excitation with He—Ne laser light (633 nm) at 12.4 $J/m^2$. Light of emission of accelerated fluorescence from the phosphor was received by a photomultiplier tube via a filter (B-410) and an accelerated-phosphorescent luminance (initial light emission amount) of the phosphor was measured.

After the measurement of the accelerated-phosphorescent luminance (initial light emission amount), the phosphor was subjected to an erasure operation using a fluorescent light equipped with a UV cut filter under a condition of 500000 lux per second, followed by irradiation with a laser beam in the same way as aforementioned. The accelerated-phosphorescent luminance (a light emission amount after erasure) of the phosphor was measured. The erasability was indicated as an erasure value obtained by the following expression. As the numerical value becomes smaller, erasability improves. The obtained results are shown in Table 1.

Erasure value=(light emission amount after the erasure/initial light emission amount)

TABLE 1

| | Condition for introduction of oxygen | Erasure value |
|---|---|---|
| Example 6 | 595 ml/total process | $8.98 \times 10^{-4}$ |
| Example 7 | 1190 ml/total process | $8.97 \times 10^{-4}$ |
| Example 8 | 295 ml/total process | $8.14 \times 10^{-4}$ |
| Example 9 | 590 ml/total process | $8.74 \times 10^{-4}$ |
| Comparative Example 1 | -/- | $1.60 \times 10^{-3}$ |

As can be seen from the results shown in Table 1, the cerium-activated, barium fluorobromide based phosphors (Examples 6 to 9) obtained by the preparing method of the present invention, that is, a method of firing in an atmosphere in which a partial pressure of a predetermined amount of oxygen increases continuously, is significantly improved relative to cerium-activated, barium fluorobromide based phosphors (Comparative example 2) obtained by a conventional firing process in an inert gas atmosphere, in terms of erasability.

As a result, accelerated-phosphorescent phosphors obtained by the preparation methods of the present invention are improved both in initial light emission and in erasability, and therefore, they are better suited for applications where reproducing characteristics are important.

What is claimed is:

1. A method for preparing a rare earth-activated, alkaline earth metal fluorohalide based phosphor, having the formula $(Ba_{1-a}M^{II}_{a})FX.bM^{I}X'.cM^{III}X''_{3}.dA: xLn$, wherein $M^{II}$ is at least one alkaline earth metal selected from the group consisting of Sr, Ca and Mg; $M^{I}$ is at least one alkali metal selected from the group consisting of Li, Na, K, Rb and Cs; $M^{III}$ is at least one trivalent metal element selected from the group consisting of Al, Ga, In, Tl, Sc, Y, La, Gd and Lu; X is at least one halogen selected from the group consisting of Cl, Br and I; each of X' and X" is at least one halogen selected from the group consisting of F, Cl, Br and I; Ln is at least one rare earth element selected from the group consisting of Ce, Pr, Sm, Eu, Gd, Tb, Dy, Ho, Nd, Er, Tm and Yb; A is at least one metallic oxide selected from the group consisting of $Al_2O_3$, $SiO_2$ and $ZrO_2$ and a, b, c, d and x are numerical values within the ranges $0 \leq a < 0.3$, $0 \leq b \leq 2$, $0 \leq c \leq 2$, $5 \times 10^{-5} \leq d \leq 0.5$, and $0 \leq x \leq 0.2$; in which phosphor materials are mixed together to obtain a mixture for preparing the rare earth-activated, alkaline earth metal fluorohalide based phosphor, and thereafter the mixture is fired under a weakly reducing atmosphere or a neutral atmosphere, the method comprising the steps of:

(a) placing the mixture in a furnace having a firing region with a capacity of 2 to 500 liters per kilogram of the mixture;

(b) firing the mixture in the furnace at a temperature of 550 to 1000° C.; and (c) introducing oxygen into the firing region of the furnace, wherein an amount of oxygen introduced is from 0.1 to 200 ml by volume at room temperature, per liter capacity of the firing region of the furnace.

2. The method of claim 1, wherein the amount of oxygen introduced is from 1 to 100 ml by volume at room temperature, per liter capacity of the firing region of the furnace.

3. The method of claim 1, wherein the step of introducing oxygen, includes introducing oxygen by using air, and if not air, then oxygen diluted by nitrogen or an inert gas.

4. The method of claim 1, wherein the step of firing the mixture includes firing for a period of 0.5 to 6 hours.

5. The method of claim 1, further comprising the step of at least partially evacuating the firing region of the furnace, prior to the step of introducing oxygen.

6. The method of claim 5, comprising the steps of:

(a) placing the mixture in a furnace having a firing region with a capacity of 2 to 500 liters per kilogram of the mixture;

(b) firing the mixture in the furnace at a temperature of 500 to 1000° C.;

(c) immediately after beginning the step of firing the mixture in the furnace, evacuating the firing region of the furnace to a pressure of no more than 0.1 torr;

(d) introducing 0.1 to 200 ml, by volume at room temperature, of oxygen into the firing region of the furnace; and (e) introducing nitrogen gas or an inert gas which does not substantially contain oxygen into the firing region of the furnace.

7. The method of claim 6, wherein the step of introducing nitrogen gas or an inert gas which does not substantially contain oxygen is introduced until the firing region of the furnace is substantially at atmospheric pressure.

8. The method of claim 1, wherein the step of introducing oxygen includes continuous, and if not continuous, then intermittent increase in the partial pressure of oxygen in the firing region of the furnace.

9. The method of claim 1, wherein the mixture contains a barium halide selected from the group consisting of $BaF_2$, $BaCl_2$, $BaBr_2$, $BaI_2$, BaFCl, BaFBr and BaFI; an alkaline earth metal halide selected from the group consisting of $CaF_2$, $CaCl_2$, $CaBr_2$, $CaI_2$, $SrF_2$, $SrCl_2$, $SrBr_2$, $SrI_2$, $MgF_2$, $MgCl_2$, $MgBr_2$ and $MgI_2$; an alkali metal halide selected from the group consisting of CsCl, CsBr, CsI, NaCl, NaBr, NaI, KCl, KBr, KI, RbCl, RbBr, RhI, RbF, CsF, NaF, KF, LiF, LiCl, LiBr and LiI; a metal oxide selected from the group consisting of $Al_2O_3$, $SiO_2$ and $ZrO_2$; and a rare earth element compound selected from the group consisting of a halide, oxide, nitrate and sulfate.

10. The method of claim 2, wherein the step of introducing oxygen, includes introducing oxygen by using air or oxygen diluted by nitrogen or an inert gas.

11. The method of claim 2, wherein the step of firing the mixture includes firing for a period of 0.5 to 6 hours.

12. The method of claim 2, further comprising the step of at least partially evacuating the firing region of the furnace, prior to the step of introducing oxygen.

13. The method of claim 12, comprising the steps of:

(a) placing the mixture in a furnace having a firing region with a capacity of 2 to 500 liters per kilogram of the mixture;

(b) firing the mixture in the furnace at a temperature of 550 to 1000° C.;

(c) immediately after beginning the step of firing the mixture in the furnace, evacuating the firing region of the furnace to a pressure of no more than 0.1 torr;

(d) introducing 0.1 to 200 ml by volume at room temperature of oxygen into the firing region of the furnace; and (e) introducing nitrogen gas or an inert gas which does not substantially contain oxygen into the firing region of the furnace.

14. The method of claim 13, wherein the step of introducing nitrogen gas or an inert gas which does not substantially contain oxygen is introduced until the firing region of the furnace is substantially at atmospheric pressure.

15. The method of claim 2, wherein the step of introducing oxygen includes continuous or intermittent increases in the partial pressure of oxygen in the firing region of the furnace.

16. The method of claim 1, wherein the mixture contains a barium halide selected from the group consisting of $BaF_2$, $BaCl_2$, $BaBr_2$, $BaI_2$, BaFCl, BaFBr and BaFI; an alkaline earth metal halide selected from the group consisting of $CaF_2$, $CaCl_2$, $CaBr_2$, $CaI_2$, $SrF_2$, $SrCl_2$, $SrBr_2$, $SrI_2$, $MgF_2$, $MgCl_2$, $MgBr_2$, and $MgI_2$; an alkali metal halide selected from the group consisting of CsCl, CsBr, CsI, NaCI, NaBr, NaI, KCI, KBr, KI, RbCI, RbBr, RbI, RbF, CsF, NaF, KF, LiF, LiCl, LiBr and LiI; a metal oxide selected from the group consisting of $Al_2O_3$, $SiO_2$, and $ZrO_2$; and a rare earth element compound selected from the group consisting of a halide, oxide, nitrate and sulfate.

* * * * *